United States Patent
Wang et al.

(10) Patent No.: US 7,663,346 B2
(45) Date of Patent: Feb. 16, 2010

(54) BATTERY CHARGER FOR PREVENTING BOTH OVERSHOOT CHARGING CURRENT AND OVERCHARGED BATTERY VOLTAGE DURING CHARGING MODE TRANSITION

(75) Inventors: Ying-Chung Wang, Hsin-Chu (TW); Pi-Fen Chen, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/241,087

(22) Filed: Sep. 30, 2008

(65) Prior Publication Data
US 2009/0021223 A1    Jan. 22, 2009

Related U.S. Application Data

(63) Continuation of application No. 10/904,775, filed on Nov. 29, 2004, now Pat. No. 7,449,865.

(51) Int. Cl.
*H02J 7/24* (2006.01)
*H02J 7/00* (2006.01)
(52) U.S. Cl. .................. 320/164; 320/159; 320/160
(58) Field of Classification Search ................ 320/159, 320/160, 164
See application file for complete search history.

(56) References Cited

U.S. PATENT DOCUMENTS

| 5,175,485 | A | * | 12/1992 | Joo | 320/159 |
| 5,637,981 | A | * | 6/1997 | Nagai et al. | 320/160 |
| 7,061,210 | B1 | * | 6/2006 | Potanin et al. | 320/160 |
| 7,102,415 | B1 | * | 9/2006 | Potanin et al. | 327/427 |

* cited by examiner

*Primary Examiner*—Patrick J Assouad
*Assistant Examiner*—Richard V Muralidar
(74) *Attorney, Agent, or Firm*—Winston Hsu

(57) ABSTRACT

A battery charger for charging a battery through controlling a charging regulation circuit is provided. The battery charger includes a current sensing unit and an operational amplifier. The current sensing unit monitors a charging current applied to the battery when the battery charger operates under a constant current mode, thereby generating a first regulation signal to the charging regulation circuit. The operational amplifier compares a battery voltage of the battery with a first reference voltage to generate a comparison result. When the battery charger operates under the constant current mode, the comparison result controls a charging mode transition from the constant current mode to a constant voltage mode. When the battery charger operates under the constant voltage mode, the comparison result acts as a second regulation signal to control the charging regulation circuit.

5 Claims, 2 Drawing Sheets

BATTERY CHARGER FOR PREVENTING BOTH OVERSHOOT CHARGING CURRENT AND OVERCHARGED BATTERY VOLTAGE DURING CHARGING MODE TRANSITION

CROSS REFERENCE TO RELATED APPLICATIONS

This continuation application claims the benefit of co-pending U.S. patent application Ser. No. 10/904,775, filed on Nov. 29, 2004 and included herein by reference.

BACKGROUND

The present invention relates to a battery charger, and more particularly, to a battery charger for preventing the charging current from overshooting during the charging mode transition.

In a battery charging system for a lithium-ion (Li-ion) battery, a constant current (CC) mode is adopted to apply a high current to an exhausted battery to activate a rapid charging operation. When the battery is charged to a termination voltage level, the battery charging system switches to a constant voltage (CV) mode to maintain the battery at this desired voltage level. Since there exists an internal resistor in the battery, the battery is not fully-charged at the end of the CC mode. The voltage drop on the internal resistor makes the battery voltage be higher than it really is in the CC mode. After entering the CV mode, the battery voltage will be kept at the desired voltage level. In other words, the battery will be kept charging until the charging current becomes zero. When the charging current is zero, there is no voltage drop on the internal resistor and the battery is fully-charged to the desired voltage level. The CC charging mode cannot be applied to the battery once the battery reaches the desired voltage level because the energy storage capacity of the battery would exceed the nominal rating, leading to AC adaptor, battery and charging system damage. However, the CC mode needs to be used during the first part of the charging operation in order to minimize overall charging time, i.e., the time for charging the battery with the CC mode must be maximized. Therefore, a proper transition between two charging modes is crucial to the battery charging system's performance.

Please refer to FIG. 1, which shows a related art battery charger 100. The related art battery charger 100 is used to charge a battery 150, and includes a charging regulation circuit 110, a comparator 120, a current sensing unit 130, and an operational amplifier 142, wherein the comparator 120 could be a hysteresis comparator for stabling the charging mode. As shown in FIG. 1, it is well-known that the battery 150 is equivalent to a series connection of an internal resistor $R_{int}$ and an internal capacitor $C_{int}$, and the charging regulation circuit 110 is connected to a power supplier (not shown). The comparator 120 is used to compare a battery voltage $V_{bat}$ of the battery 150 with a reference signal $V_{ref\_1}$ to check whether the battery voltage $V_{bat}$ is below a threshold. If the battery voltage $V_{bat}$ is lower than the reference signal $V_{ref\_1}$, the comparator 120 sends out a non-enabling signal D' to switch on switches SW1, SW3, and to switch off switches SW2, SW4, and then the battery 150 is charged in the CC mode.

In the CC mode the charging regulation circuit 110 is controlled to provide the battery 150 with a constant charging current. As shown in FIG. 1, the charging regulation circuit 110 is configured by a PMOS transistor 111 to regulate the required charging current. The current sensing unit 130 includes a sensor 135, which monitors the charging current flowing through the resistor R. After measuring the charging current flowing through the resistor R, the sensor 135 outputs a voltage V1, which corresponds to the voltage drop across the resistor R, into an operational amplifier 132. For example, if the detected voltage drop is 160 mV, the sensor 135 converts the voltage drop into a voltage level of 160 mV. The operational amplifier 132 sends out a regulation signal S1 to adjust the gate voltage of the PMOS 111 for stabilizing the charging current outputted from the power supplier, which is further explained as follows. Here, the charging regulation circuit 110, the resistor R, the sensor 135, and the operational amplifier 132 form a closed loop. As shown in FIG. 1, the operational amplifier 132 determines the voltage level of the regulation signal S1 by comparing the incoming voltage V1 with a reference signal $V_{ref\_2}$. Assume the charging current during the CC mode is designed to be 10 mA, and the resistance of the resistor R is a known value 50Ω. It is clear that if the charging regulation circuit 110 successfully outputs the desired charging current 10 mA, the voltage drop cross the resistor R will be 500 mV. Therefore, the reference signal $V_{ref\_2}$ is set to 500 mV for checking whether the current flowing through the resistor R has the desired current value. If the voltage V1 is greater than the reference signal $V_{ref\_2}$, the regulation signal S1, which has a higher voltage level amplified by the operational amplifier 132, controls the charging regulation circuit 110 to reduce the charging current; however, if the voltage V1 is less than the reference signal $V_{ref\_2}$, the regulation signal S1, which has a lower voltage level amplified by the operational amplifier 132, controls the charging regulation circuit 110 to increase the charging current. As a result, the battery 150 receives a constant charging current generated from the power supplier.

The battery charger 100 uses the CV mode instead of the CC mode when the battery voltage $V_{bat}$ is at a termination voltage level, that is, a reference voltage $V_{ref\_3}$. When the battery charger 100 is charging in the CC mode, the comparator 120 keeps comparing the battery voltage $V_{bat}$ with the reference voltage $V_{ref\_3}$. When the battery voltage $V_{bat}$ is not less than the reference voltage $V_{ref\_3}$, the comparator 120 sends out an enabling signal D to change the on/off states of the switches. Therefore, switches SW1, SW3 are switched off, and switches SW2, SW4 are switched on. As a result, the battery charger 100 enters the CV mode.

In the CV mode the charging regulation circuit 110 charges the battery 150 to the termination voltage level and the battery charger 100 maintains the battery voltage $V_{bat}$ at the termination voltage level. In the CV mode, the operational amplifier 142 acts as a regulator to regulate the charging current. The operational amplifier 142 compares the battery voltage $V_{bat}$ with a reference voltage $V_{ref\_3}$, and sends out a regulation signal S2 to control the gate voltage of the PMOS 111 for further tuning the charging current. Similar to the CC mode, the CV mode also forms a closed loop including the charging regulation circuit 110, the resistor R, and the operational amplifier 142. In order to stabilize the battery voltage $V_{bat}$ at the reference voltage $V_{ref\_3}$, the operational amplifier 142 compares the reference voltage $V_{ref\_3}$ with the battery voltage $V_{bat}$ to decide how to regulate the charging current. In other words, the gate voltage of the PMOS transistor 111 is precisely adjusted by the regulation signal S2 when the battery voltage $V_{bat}$ deviates from the reference voltage $V_{ref\_3}$. As a result, the battery 150 is steadily charged at the constant battery voltage $V_{bat}$.

The battery charger 100 will enter the CC mode again when the battery voltage $V_{bat}$ is lower than the reference voltage $V_{ref\_1}$, for example, the fully-charged battery 150 is removed and a new exhausted battery is connected, which is explained as follows. During charging in the CV mode, the operational amplifier 142 controls the charging regulation circuit 110, while the comparator 120 keeps comparing the battery voltage $V_{bat}$ with the reference signal $V_{ref\_1}$, which is lower than the reference voltage $V_{ref\_3}$. When a fully-charged battery is taken away and an exhausted battery is connected to the battery charger 100, the battery voltage $V_{bat}$ becomes low. If the battery voltage $V_{bat}$ is lower than the reference signal $V_{ref\_1}$, the comparator 120 sends out the non-enabling signal D' to initialize the battery charger 100, setting it into the CC mode wherein switches SW1, SW3 are on and switches SW2, SW4 are off. Therefore, the battery charger 100 again provides the exhausted battery with a constant charging current.

As mentioned above, there are two modes, the CC mode and the CV mode, selectively used by the battery charger 100; hence there is a transition between these two modes. However, because the comparators 120 and the operational amplifier 142 are not perfectly matched due to well-known manufacturing variations, the transition between these two modes may not be very smooth, and this situation could cause an overshoot charging current to damage an AC adaptor, the battery charger 100 or the battery 150. For example, assume that the constant charging current during the CC mode is 800 mA, the reference signal $V_{ref\_1}$ is 4.1 V, and the reference voltage $V_{ref\_3}$ is 4.2V. Ideally, the transition occurs when the battery voltage $V_{bat}$ is equal to 4.2V, and then the CV mode closed loop is enabled to maintain the battery voltage $V_{bat}$ at 4.2V. As a result, the charging current at the transition moment would still be 800 mA, and the transition between two modes would therefore be very smooth. However, practically, because the comparator 120 and the operational amplifier 142 are not matched in their characteristics, the voltage at which the transition occurs and the voltage at which the CV mode loop tries to maintain are likely to be different. That is, if the comparator 120 abnormally sends out the enabling signal D when $V_{bat}$ is still less than 4.2V, for example 4.1V, and then the operational amplifier 142 will sends out a regulation signal S2 to maintain the battery voltage $V_{bat}$ at 4.2V by increasing the charging current by controlling the PMOS 111. Therefore, an overshoot charging current capable of damaging the AC adaptor, the battery charger 100 or the battery 150 is likely to be induced. In another case, if the comparator 120 does not send out the enabling signal D when $V_{bat}$ is already more than 4.2V, for example 4.3V, then the battery 150 is likely to be overcharged which may damage the battery 150.

With this in mind, it is desirable to provide a battery charger which can eliminate both the overshoot charging current and the overcharged battery voltage to prevent the AC adaptor, the battery charger and the battery from being damaged.

SUMMARY

One objective of the claimed invention is therefore to provide a battery charger having one operational amplifier which acts as a comparator in one mode (e.g., the constant current mode) and acts as a controller in another mode (e.g., the constant voltage mode).

According to an exemplary embodiment of the present invention, a battery charger for charging a battery through controlling a charging regulation circuit is provided. The battery charger includes a current sensing unit and an operational amplifier. The current sensing unit is configured to monitor a charging current applied to the battery when the battery charger operates under a constant current mode, thereby generating a first regulation signal to control the charging regulation circuit to regulate a battery voltage at a predetermined current level. The operational amplifier is configured to compare the battery voltage of the battery with a first reference voltage to generate a first comparison result. When the battery charger operates under the constant current mode, the operational amplifier generates the first comparison result to control a charging mode transition of the battery charger from the constant current mode to a constant voltage mode. When the battery charger operates under the constant voltage mode, the operational amplifier generates the first comparison result to act as a second regulation signal, and utilizes the second regulation signal to control the charging regulation circuit to regulate the charging current applied to the battery.

By utilizing the exemplary battery charger of the present invention, both the overshoot charging current and the overcharged battery voltage can be prevented, so the mode transition becomes smooth.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
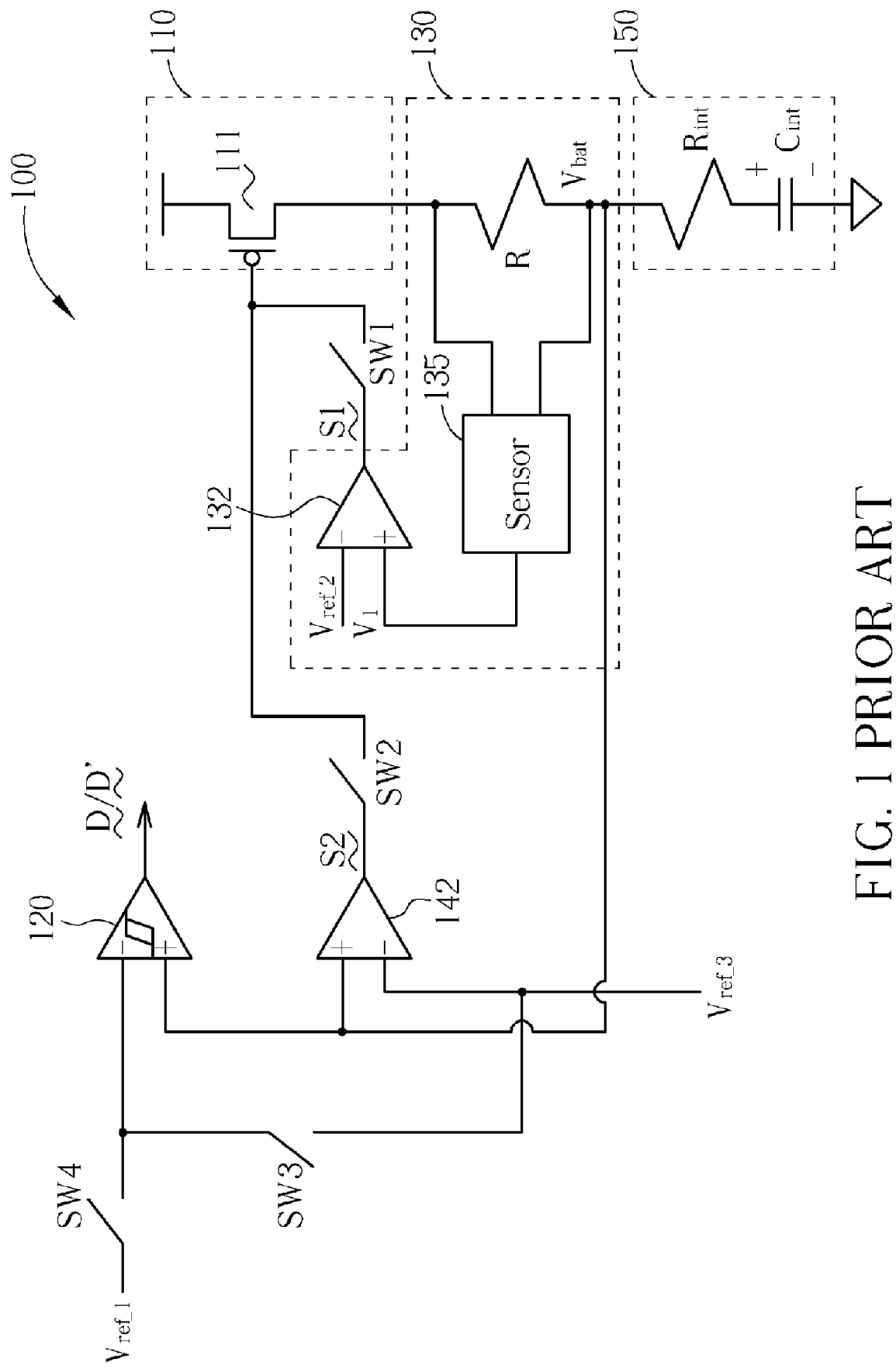
FIG. 1 is a diagram of a battery charger according to the related art.
Figure 2:
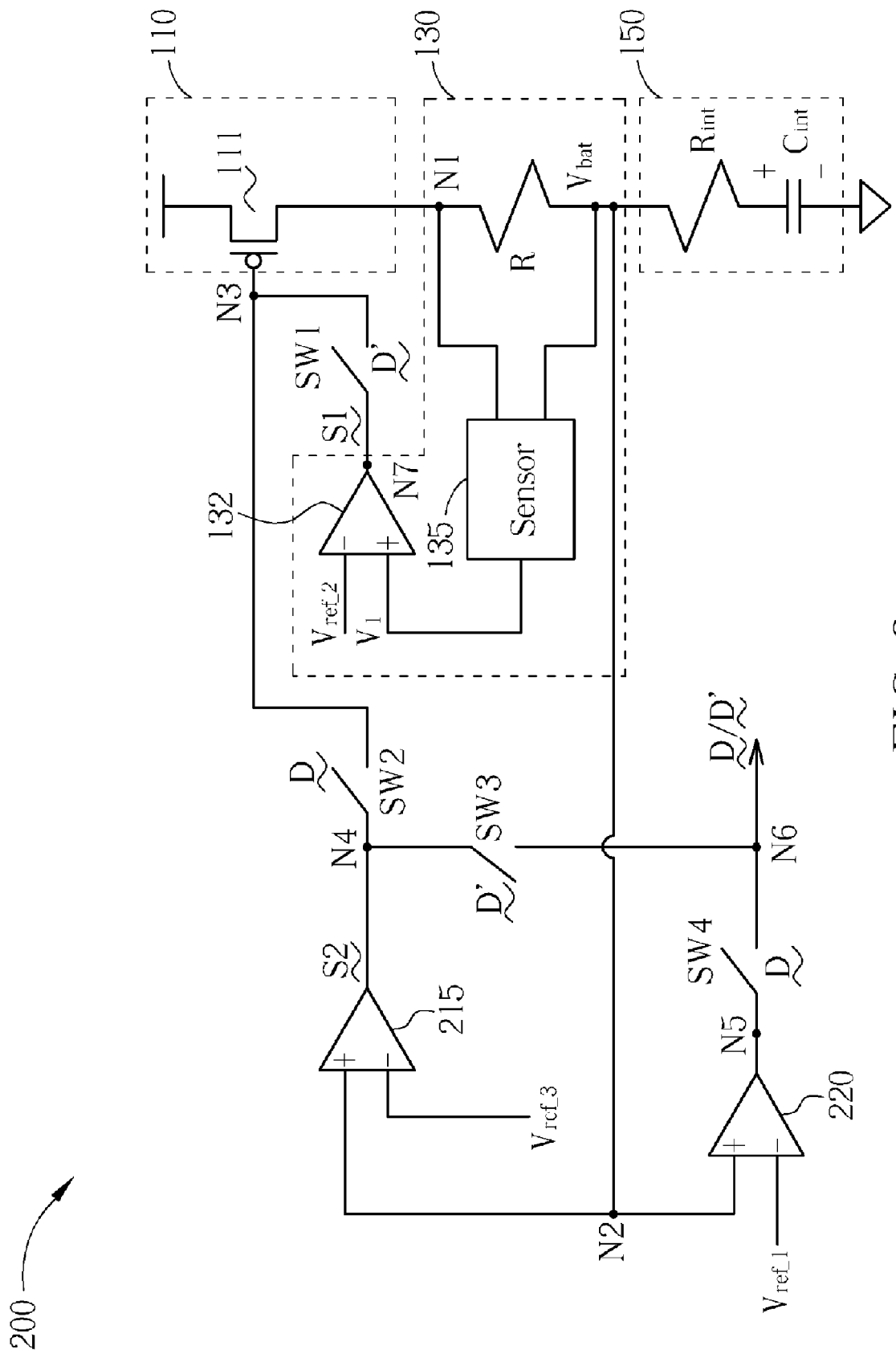
FIG. 2 is a diagram of a battery charger according to an embodiment of the present invention.

In order to reduce both the overshoot charging current and the overcharged battery voltage, the mismatch problem originating from the related art comparator 120 and the related art operational amplifier 142 must be solved. Please refer to FIG. 2, which shows a battery charger 200 according to an embodiment of the present invention. The battery charger 200 is used to charge the battery 150, and includes the charging regulation circuit 110, the current sensing unit 130, an operational amplifier 215, and a comparator 220. The charging regulation circuit 110 and the current sensing unit 130 are the same circuit components shown in FIG. 1. Therefore, the lengthy description for the charging regulation circuit 110 and the current sensing unit 130 is omitted here for brevity. As to the operational amplifier 215, it not only controls the charging regulation circuit 110 during the CV mode but also severs as a comparator to generate a switch control signal when the battery charger 200 is operating in the CC mode. The related operation of the operational amplifier 215 is described as follows.

In this embodiment, during the CC mode the switches SW1, SW3 are switched on, and the switches SW2, SW4 are switched off; however, during the CV mode the switches SW1, SW3 are switched off, and the switches SW2, SW4 are switched on. Concerning the battery charger 200 operating in the CC mode, the operational amplifier 215, therefore, compares the battery voltage $V_{bat}$ with the reference voltage $V_{ref\_3}$. When the battery voltage $V_{bat}$ is not less than the reference voltage $V_{ref\_3}$, the operational amplifier 215 outputs an enabling signal D having a logic high level to change the on/off states of the switches SW1, SW2, SW3, and SW4, turning switches SW1, SW3 off and turning switches SW2, SW4 on. In other words, the battery charger 200 enters the CV mode. Please note that in FIG. 2, switches SW1 and SW3 are illustrated as being turned on by a non-enabling signal D' which is an inverse version of the enabling signal D (i.e., enabling signal D and non-enabling signal D have opposite logic levels), whereas switches SW2 and SW4 are illustrated as being turned on by the enabling signal D. Therefore, in this exemplary embodiment, the switches SW1 and SW3 are turned on only when a comparison result of the operational amplifier 215 or the comparator 220 corresponds to a logic low level, and the switches SW2 and SW4 are turned on only when a comparison result of the operational amplifier 215 or the comparator 220 corresponds to a logic high level. When charging in the CV mode the charging regulation circuit 110, the resistor R, and the operational amplifier 215 form a closed loop to keep the battery voltage $V_{bat}$ held at a voltage level equal to the reference voltage $V_{ref\_3}$. Because the single operational amplifier 215 both triggers the enabling signal D and controls the charging regulation circuit 110, there is no mismatch problem. As a result, the battery voltage $V_{bat}$ is precisely maintained at a constant voltage, specifically, the reference voltage $V_{ref\_3}$ during the mode transition. As a result, neither an overshoot charging current nor an overcharged battery voltage occurs.

Moreover, when in the CV mode, the comparator 220 compares the battery voltage $V_{bat}$ with the reference voltage $V_{ref\_1}$. For example, when the battery 150 is fully charged and replaced by another exhausted battery, the battery voltage $V_{bat}$ of the exhausted battery is less than the reference voltage $V_{ref\_1}$, so the comparator 220 outputs the non-enabling signal D' having a logic low level to change the states of the switches SW1, SW2, SW3, and SW4. Therefore, switches SW1, SW3 are switched on, while switches SW2, SW4 are switched off. Thus the battery charger 200 enters the CC mode, and the operational amplifier 215 serves as a normal comparator again for detecting whether the battery voltage $V_{bat}$ has reached the reference voltage $V_{ref\_3}$.

In summary, to solve the above-mentioned mismatch problem, one single operational amplifier is utilized as a comparator in one mode (i.e., the CC mode) and as a controller in another mode (i.e., the CV mode). Additionally, there is also a comparator which compares the battery voltage $V_{bat}$ with another threshold voltage level to determine when to switch the battery charger from the CV mode to the CC mode. The battery charging components used by the battery charger according to the present invention is similar to that of the related art; however, with a new circuit configuration, a crucial problem that previously occurred during the mode transition is successfully solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery charger for charging a battery through controlling a charging regulation circuit, comprising:
a current sensing unit, configured to monitor a charging current applied to the battery when the battery charger operates under a constant current mode, thereby generating a first regulation signal to control the charging regulation circuit to regulate the charging current at a predetermined current level; and
an operational amplifier, configured to compare a battery voltage of the battery with a first reference voltage to generate a first comparison result, wherein when the battery charger operates under the constant current mode, the operational amplifier generates the first comparison result to control a charging mode transition of the battery charger from the constant current mode to a constant voltage mode, and when the battery charger operates under the constant voltage mode, the operational amplifier generates the first comparison result to act as a second regulation signal, and utilizes the second regulation signal to control the charging regulation circuit to regulate the battery voltage applied to the battery.

2. The battery charger of claim 1, further comprising:
a first switch, configured to transmit the first regulation signal generated from the current sensing unit to the charging regulation circuit when switched on;
a second switch, configured to transmit the second regulation signal generated from the operational amplifier to the charging regulation circuit when switched on;
wherein when the battery voltage is not lower than the first reference voltage, the operational amplifier generates the first comparison result serving as a switch control signal to switch on the second switch and switch off the first switch.

3. The battery charger of claim 2, further comprising:
a third switch, configured to transmit the first comparison result serving as the switch control signal when switched on;
wherein when the battery voltage is not lower than the first reference voltage, the operational amplifier generates the first comparison result serving as the switch control signal to switch off the third switch.

4. The battery charger of claim 3, further comprising:
a comparator, configured to compare the battery voltage with a second reference voltage to generate a second comparison result;
a fourth switch, configured to transmit the second comparison result serving as the switch control signal when switched on;
wherein when the battery voltage is not lower than the first reference voltage, the operational amplifier generates the first comparison result serving as the switch control signal to switch on the fourth switch; and when the battery voltage is lower than the second reference voltage, the comparator generates the second comparison result serving as the switch control signal to switch on the first and third switches and switch off the second and fourth switches.

5. The battery charger of claim 4, wherein the first reference voltage is higher than the second reference voltage.

* * * * *